US011605860B2

(12) United States Patent
Scharf et al.

(10) Patent No.: US 11,605,860 B2
(45) Date of Patent: Mar. 14, 2023

(54) BATTERY PACK

(71) Applicant: Advanced Powering Services, Inc., Rancho Santa Margarita, CA (US)

(72) Inventors: Timothy W. Scharf, Lake Forest, CA (US); Richard J. Bower, Trabuco Canyon, CA (US)

( * ) Notice: Subject to any disclaimer, the term of this patent is extended or adjusted under 35 U.S.C. 154(b) by 140 days.

(21) Appl. No.: 17/067,716

(22) Filed: Oct. 11, 2020

(65) Prior Publication Data

US 2022/0115727 A1    Apr. 14, 2022

(51) Int. Cl.
| *H01M 50/204* | (2021.01) |
| *H01M 10/42* | (2006.01) |
| *H01M 50/251* | (2021.01) |
| *H01M 50/264* | (2021.01) |
| *H01M 50/271* | (2021.01) |

(52) U.S. Cl.
CPC ....... *H01M 50/204* (2021.01); *H01M 10/425* (2013.01); *H01M 50/251* (2021.01); *H01M 50/264* (2021.01); *H01M 50/271* (2021.01); *H01M 2010/4271* (2013.01); *H01M 2220/10* (2013.01)

(58) Field of Classification Search
CPC .................................................. H01M 50/204
See application file for complete search history.

(56) References Cited

U.S. PATENT DOCUMENTS

| 7,029,787 | B2 | 4/2006 | Bando et al. |
| 7,088,075 | B2 | 8/2006 | Baba et al. |
| 8,703,325 | B2 | 8/2014 | Pellenc |
| 2005/0077871 | A1 | 4/2005 | Chalasani et al. |
| 2008/0055849 | A1 | 3/2008 | Lee |
| 2017/0279170 | A1* | 9/2017 | O'Hora ............. H01M 10/6567 |

FOREIGN PATENT DOCUMENTS

| CN | 106655405 A | | 5/2017 | |
| CN | 108431990 A | * | 8/2018 | ........ H01M 10/4257 |
| FI | 127220 B | | 1/2018 | |
| JP | 3631054 | | 3/2005 | |

* cited by examiner

*Primary Examiner* — Brian R Ohara
(74) *Attorney, Agent, or Firm* — Thomas W. Galvani, P.C.; Thomas W. Galvani (57) ABSTRACT

A battery pack including a rectangular prismatic outer housing including a front and a back, opposed sides, a bottom and an open top, and a lid applied to the open top to define a closed outer hold within the outer housing. The battery pack further includes a power switch, a power port, an input/output, and a display all carried in the front of the outer housing. An inner housing is within the outer hold of the outer housing and includes a basin and a lid applied to the basin to define a closed inner hold within the inner housing. A plurality of battery cells are disposed entirely within the inner hold, and the battery cells are electrically coupled to the power port to provide power to the power port.

25 Claims, 5 Drawing Sheets

BATTERY PACK

FIELD

The present specification relates generally to telecommunications, and more particularly to field power solutions for telecommunications equipment.

BACKGROUND

A majority of telecommunications equipment is placed in the field, where it is close to the customers who use it. This equipment must be powered. In some cases, the telecommunications line itself carries a powered signal, and that small power signal is enough to operate some pieces of equipment. During a power outage, the power in that line is generally not sufficient to power all forms of telecommunication and is definitely not enough to power larger equipment. As a result, an electrical line must generally be used to power larger pieces of telecommunications equipment. But these lines fail as well.

Batteries are thus frequently placed in telecommunications cabinets in the field along with the equipment to which they provide backup power. Conventionally, lead-acid batteries are used for backup power. However, there are a number of problems with lead-acid batteries. For example, they require ventilation, which exposes the components of the cabinet to water and air intrusion. They are large and unwieldy. They are so heavy that they generally are placed at the bottom of the cabinet and thus limit the design and use of the cabinet. They require special handling and disposal because of their hazardous contents. It can be difficult to detect damaged or defective batteries. They are also targets for theft, as their contents can be resold for value. An improved telecommunications battery backup is needed.

SUMMARY

A battery pack including a rectangular prismatic outer housing including a front and a back, opposed sides, a bottom and an open top, and a lid applied to the open top to define a closed outer hold within the outer housing. The battery pack further includes a power switch, a power port, an input/output, and a display all carried in the front of the outer housing. An inner housing is within the outer hold of the outer housing and includes a basin and a lid applied to the basin to define a closed inner hold within the inner housing. A plurality of battery cells are disposed entirely within the inner hold, and the battery cells are electrically coupled to the power port to provide power to the power port. The battery pack further includes a lid with perimeter, a downwardly-turned channel at the perimeter, and a gasket in the channel. Outboard of the channel, the lid includes holes formed through the lid and registered with tapped holes in the basin. When the lid is secured to the basin with fasteners applied to the holes and the threaded holes, the gasket is compressed between the channel and the basin to form an impermeable seal. Blind sockets are on a bottom of the basin, and bores in the bottom of the outer housing are registered with the blind sockets. The bores are arranged on the bottom to dispose the inner housing proximate to the back of the outer housing. A tray is within the inner hold, the plurality of battery cells are stacked in an array on the tray, and a strap is secured to the tray and wrapped over the array of battery cells. The tray includes a bottom panel, a rear wall, and a side wall. A battery management system, for controlling and reporting operating information about the battery cells, is fixed on one of the rear and side walls and is spaced apart from the battery cells. A control board, for controlling operation of the battery pack, is fixed on one of the rear and side walls and is spaced apart from the battery cells. The battery pack further includes a web defining a plurality of cradles, each cradle holding a battery cell. Each battery cell has opposed anode and cathode ends and is elongate therebetween, and each battery cell is supported in the cradle between the anode and cathode ends. End covers flank all of the battery cells at the anode and cathode ends thereof, and each end cover is formed with a knockout registered with each battery cell. The battery pack further includes a kit of first and second mounting brackets, wherein each of the first and second mounting brackets has a first leaf having a first dimension and a second leaf having a second dimension. The first and second leaves are set at a right angle with respect to each other. On the first mounting bracket, the first and second dimensions are equal, and on the second mounting bracket, the first dimension is greater than the second dimension.

In another embodiment, a battery pack includes a rectangular prismatic outer housing including a front and a back, opposed sides, a bottom and an open top, and a lid applied to the open top to define a closed outer hold within the outer housing. A power port is carried in the front of the outer housing. An inner housing is within the outer hold of the outer housing, and the inner housing includes a basin and a lid applied to the basin to define a closed inner hold within the inner housing. A tray is within the inner hold, and a plurality of battery cells are stacked in an array on the tray. A strap is secured to the tray and wrapped over the array of battery cells. The array includes at least two rows and at least two columns of battery cells. The tray includes a bottom panel, a rear wall, and a side wall. The battery pack further includes a battery management system, for controlling and reporting operating information about the battery cells, which is fixed on one of the rear and side walls and is spaced apart from the battery cells. A control board, for controlling operation of the battery pack, is fixed on one of the rear and side walls and is spaced apart from the battery cells. A web defines a plurality of cradles, each cradle holding a battery cell. Each battery cell has opposed anode and cathode ends and is elongate therebetween, and each battery cell is supported in the cradle between the anode and cathode ends. End covers flank all of the battery cells at the anode and cathode ends thereof, and each end cover is formed with a knockout registered with each battery cell.

In another embodiment, the battery pack includes a rectangular prismatic outer housing including a front and a back, opposed sides, a bottom and an open top, and a lid applied to the open top to define a closed outer hold within the outer housing. A power port is carried in the front of the outer housing. An inner housing is within the outer hold of the outer housing and includes a basin and a lid applied to the basin to define a closed inner hold within the inner housing. A plurality of battery cells are disposed entirely within the inner hold, and the battery cells are electrically coupled to the power port to provide power to the power port. The battery pack further includes a kit of first and second mounting brackets, wherein each of the first and second mounting brackets has a first leaf having a first dimension and a second leaf having a second dimension. The first and second leaves are set at a right angle with respect to each other. On the first mounting bracket, the first and second dimensions are equal, and on the second mounting bracket, the first dimension is greater than the second dimension. The major and minor leaves are rigidly and integrally formed to each other. The lid includes a perimeter, a downwardly-turned channel at the perimeter, and a gasket in the channel. Outboard of the channel, the lid includes holes formed through the lid and registered with tapped holes in the basin. When the lid is secured to the basin with fasteners applied to the holes and the threaded holes, the gasket is compressed between the channel and the basin to form an impermeable seal. Blind sockets are formed on a bottom of the basin, and bores in the bottom of the outer housing are registered with the blind sockets. The bores are arranged on the bottom to dispose the inner housing proximate to the back of the outer housing. A tray is within the inner hold, the plurality of battery cells are stacked in an array on the tray, and a strap is secured to the tray and wrapped over the array of battery cells. The tray includes a bottom panel, a rear wall, and a side wall. The battery pack further includes a web defining a plurality of cradles, each cradle holding a battery cell. Each battery cell has opposed anode and cathode ends and is elongate therebetween and is supported in the cradle between the anode and cathode ends. The end covers flank all of the battery cells at the anode and cathode ends thereof, and each end cover is formed with a knockout registered with each battery cell.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

Figure 1:
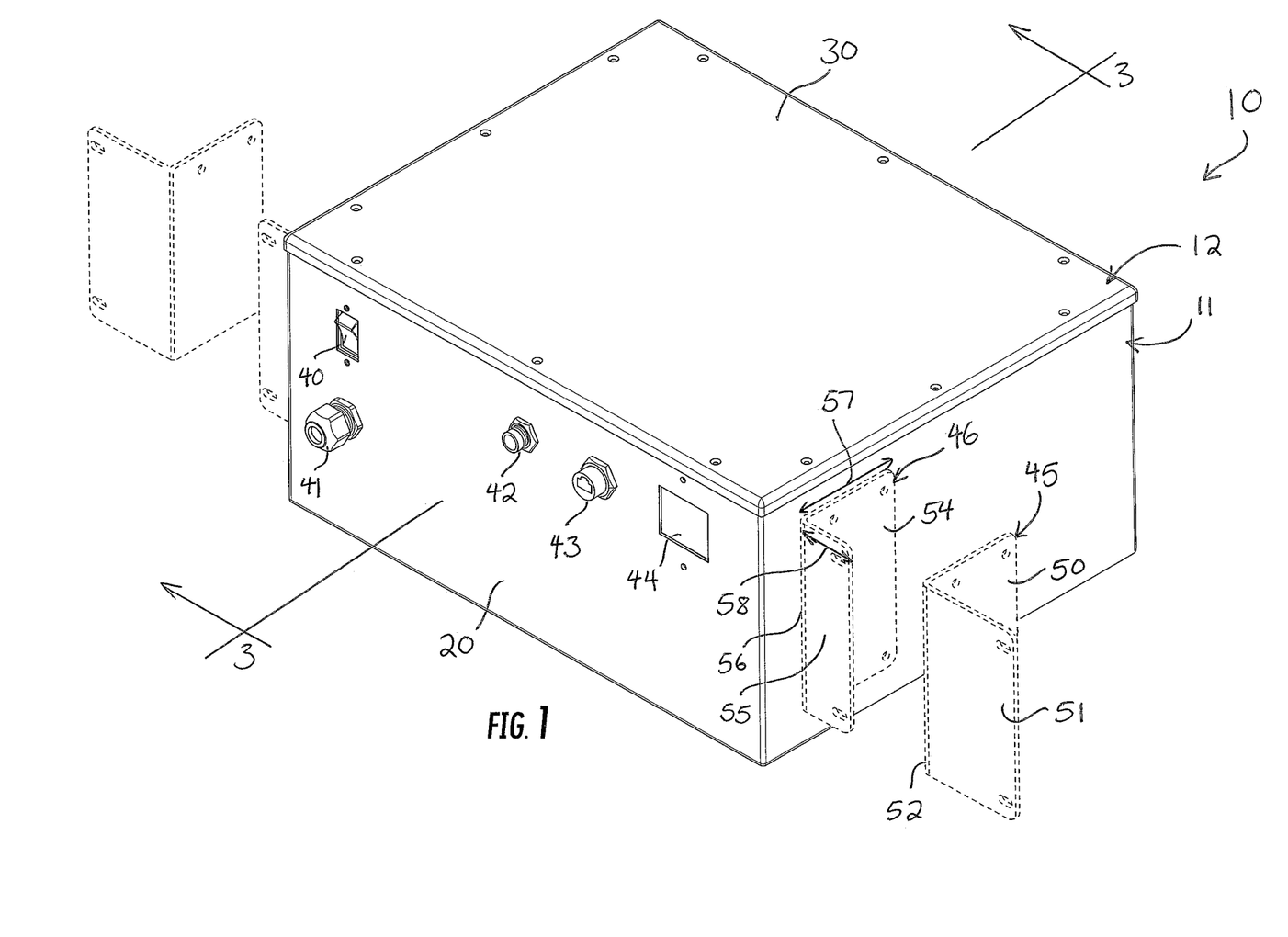
FIG. 1 is a top perspective view of a battery pack.
Figure 2:
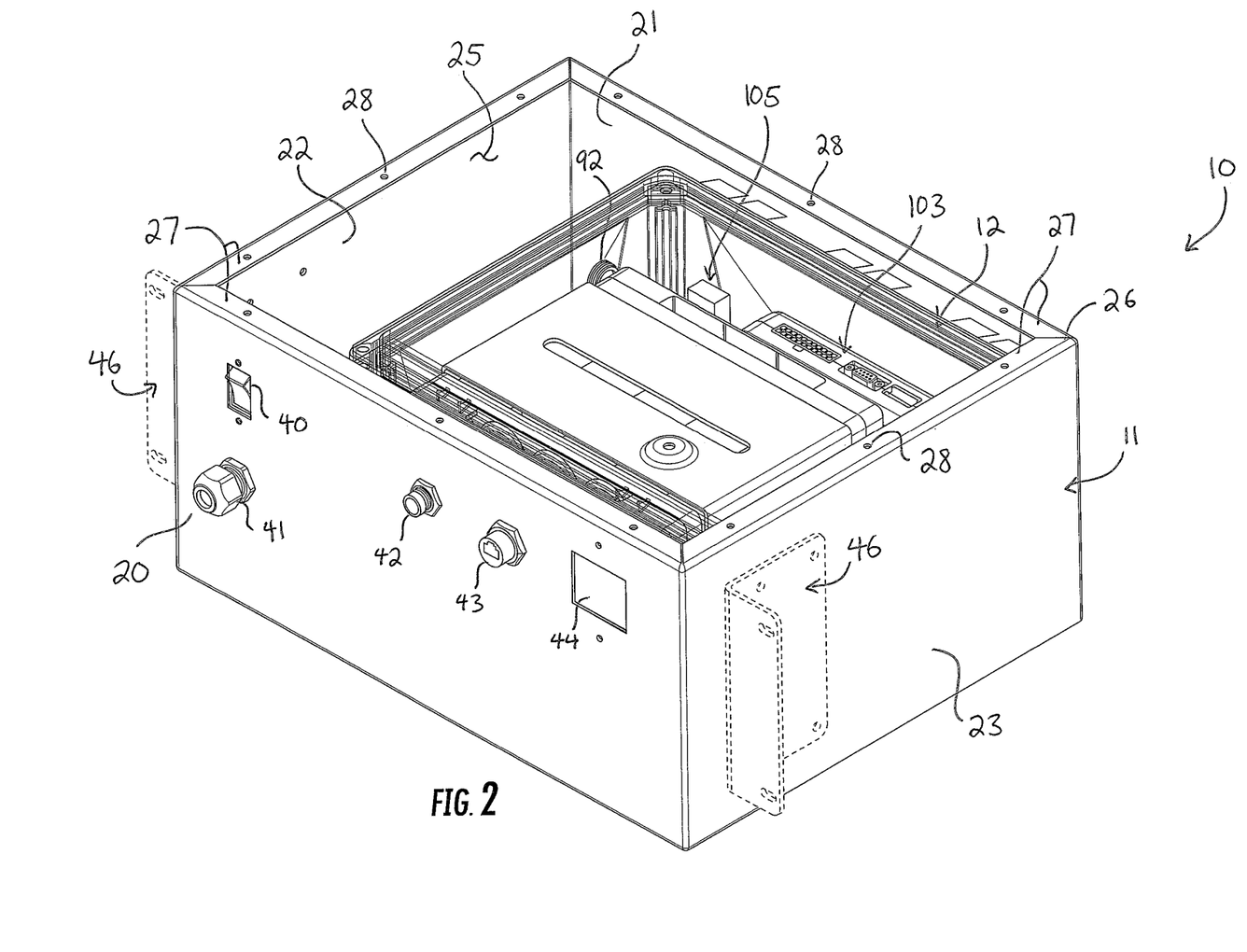
FIG. 2 is a top perspective view of the battery pack with a lid removed.

FIG. 1 is a top perspective view illustrating a battery pack 10. The battery pack 10 includes an outer housing 11 and a lid 12 applied thereto. FIG. 2 shows the outer housing 11 with the lid 12 removed, so that a transparent inner housing 13 within the outer housing 11 is visible. Protected within the inner housing 13 are electrical and electronic components of the battery pack 10.

Figure 3:
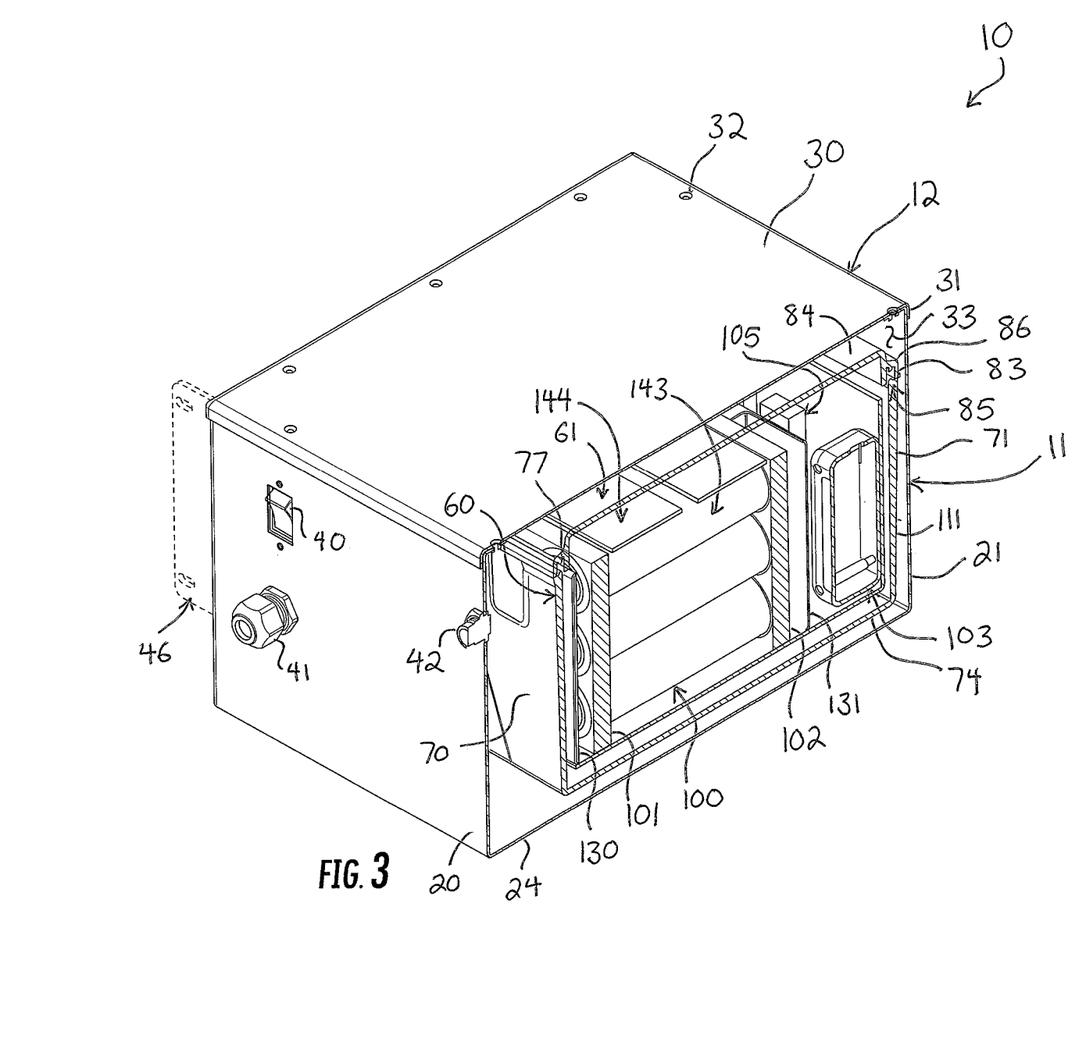
FIG. 3 is a top perspective section view of the battery pack, taken along the line 3-3 in FIG. 1.

Reference is now made to FIGS. 1 and 2 and the section view of FIG. 3. The outer housing 11 is rectangular prismatic. It includes a front 20, an opposed back 21, opposed left and right sides 22 and 23. The outer housing 11 has a closed bottom 24 and an opposed open top 25. The front 20, back 21, left side 22, right side 23, and bottom 24 are flat and planar and are constructed from a single monolithic sheet bent or formed from a single piece of strong, rigid, rugged, durable material, such as steel, aluminum, or like metal or material. The front 20, back 21, left side 22, and right side 23 are joined at elongate corners, thereby defining a continuous sidewall which is also formed continuously to the bottom 24 at elongate bottom corners. The outer housing 11 thus defines an enclosed, fluid-impervious basin or tub. The front 20, back 21, left side 22, and right side 23 each turn inwardly at their tops, forming a continuous flat rim 26 at the open top 25 of the outer housing 11. Pads, or gaskets 27, are fixed to the rim 26 above each of the front 20, back 21, left side 22, and right side 23, and bores 28 pass through the gaskets 27 and through the rim 26, where the bores 28 are threaded. As such, when the lid 12 is placed over the outer housing 11, the lid 12 can be tightened onto the outer housing 11 to form a fluid-impermeable seal therewith.

The lid 12 itself is a generally planar element formed from a monolithic sheet bent from a single piece of strong, rigid, rugged, durable material, such as steel, aluminum, or like metal or material. The lid 12 includes a flat top 30 with a downwardly-turned lip 31 around a perimeter of the lid 12. The lid 12 is rectangular, such that the lip 31 has four elongate, linear sides. Small holes 32 extend through the top 30 of the lid 12 and are spaced apart around the perimeter of the lid 12 and just inboard from the lip 31. When the lid 12 is applied over the open top 25 of the outer housing 11, these holes 32 are registered with the threaded bores 28 in the rim 26, and the lip 31 overlaps the tops of the front 20, back 21, left side 22, and right side 23, such that the lid 12 and outer housing 11 cooperate to define a closed outer hold 33 within the outer housing 11, as shown in FIG. 3. This outer hold 33 occupies the entire space between the lid 12 and the outer housing 11, is rectangular prismatic, and is sealed from the outside environment.

The outer housing 11 provides a number of ways to interact or engage with the electrical and electronic components of the battery pack 10. Referring to FIG. 2, the front 20 of the outer housing 11 carries a power switch 40, a power port 41, two input-output or I/O ports 42 and 43, and a display 44. Each of these is described in greater detail later in this specification. The power switch 40 includes a thirty Amp fuse or breaker and is used to manually power the battery pack 10 on and off, and the power port 41 allows a technician to connect an external device to the battery pack 10 to receive power therefrom. The I/O ports 42 and 43 allow a technician to connect an external device to read from or write to the electronic components within the battery pack 10, and the display 44 provides a human-readable output display showing some of the operational information of battery pack 10.

The outer housing 11 has a width between its left side 22 and its right side which is sized to fit in both a nineteen-inch and a twenty-three-inch telecommunications rack. To that end, the outer housing 11 includes a kit of first and second mounting brackets 45 and 46. The first mounting bracket 45 is considered a twenty-three-inch bracket and the second mounting bracket 46 is a nineteen-inch bracket, for the reasons described below.

The twenty-three-inch bracket 45 includes a first leaf 50 and a second leaf 51, which are coextensive with each other and are joined rigidly to each other at an elongate corner 52. The first and second leaves 50 and 51 are set at a right angle with respect to each other about the corner 52. Since the leaves 50 and 51 are coextensive, they extend away from the corner 52 an equal distance. The first leaf 50 has a four-hole pattern formed therethrough for fastening the bracket 45 to the left or right side 22 or 23 of the outer housing, and the second leaf 51 has a vertical two-hole pattern formed therethrough for fastening the bracket 45 to a bolt pattern in the telecommunications rack in the telecom cabinet. When the brackets 45 are mounted to each of the left and right sides 22 and 23, the outer housing 11 may be positioned in and fastened to a twenty-three-inch telecommunications rack, because the second leaf 51 extends from the left and right sides 22 and 23 to lap over the front of the rack.

The nineteen-inch bracket 46 includes a first or major leaf 54 and a second or minor leaf 55, which are joined rigidly to each other at an elongate corner 56. The major and minor leaves 54 and 55 are set at a right angle with respect to each other about the corner 56. These leaves 54 and 55 are not coextensive and so they extend away from the corner 56 different distances.

The major leaf 54 has a first or major dimension 57 extending between the corner 56 and the outer edge of the major leaf 54 opposite the corner 56. The minor leaf 55 has a second or minor dimension 58 extending between the corner 56 and the outer edge of the minor leaf 55 opposite the corner 56. The major dimension 57 is larger than the minor dimension 58. The major leaf 54 has a four-hole pattern formed therethrough for fastening the bracket 46 to the left or right side 22 or 23 of the outer housing 11, and the minor leaf 55 has a vertical two-hole pattern formed therethrough for fastening the bracket 46 to a bolt pattern in the telecommunications rack in the telecom cabinet. When the brackets 46 are mounted to each of the left and right sides 22 and 23, the outer housing 11 may be positioned in and fastened to a nineteen-inch telecommunications rack, because the minor leaf 55 extends from the left and right sides 22 and 23 to lap over the front of the rack.

With reference now to FIGS. 2 and 3 primarily, within the outer hold 33 is the inner housing 13, which includes a basin 60 and a lid 61 removably applied to the basin 60 to define a closed inner hold 62 within the inner housing 13. The basin 60 and lid 61 are both constructed from a monolithic form or cast having hard, strong, rigid, rugged, and durable material characteristics, such as plastic or like material. The lid 61 is also preferably transparent, so that the contents of the inner hold 62 can be viewed when the lid 12 of the outer housing 11 is removed.

The basin 60 is rectangular prismatic. It includes a front 70, an opposed back 71, opposed left and right sides 72 and 73. The basin 60 has a closed bottom 74 and an opposed open top 75. The front 70, back 71, left side 72, right side 73, and bottom 74 are generally planar. The front 70, back 71, left side 72, right side 73, and bottom 74 are joined at elongate corners, thereby defining a continuous sidewall which is also formed continuously to the bottom 74 at elongate bottom corners. The basin 60 thus defines an enclosed, fluid-impervious tub. The front 70, back 71, left side 72, and right side 73 each turn inwardly at their tops, forming a continuous flat rim 76 at the open top 75 of the basin 60. An upstanding short wall 77 extends upward from the flat rim 76 at its inner edge, such that the rim 76 projects laterally outward from the wall 77. The rim 76 and wall 77 define an engagement element for the lid 61. The rim 76 has four corners. A threaded bore 80 extends through each corner to receive a fastener which secures the lid 61 to the basin 60.

The lid 12 has a generally thin profile; it has a rectangular perimeter lip 83 depending from a low dome 84 which spans slightly above the perimeter lip 83. The dome 84 projects just slightly above the perimeter lip 83, such that it defines an internal cavity underneath. The perimeter lip 83 extends continuously and entirely around the lid 12 and includes two downwardly-projecting and spaced-apart inner and outer walls defining a downwardly-turned channel 85 in the lip 83. An elastomeric gasket 86 is pressed into the channel 85 until its bottom edge is flush with the bottom of the lip 83. At corners of the lid 12, outboard of the channel 85, four holes 87 are formed through the perimeter lip 83. These holes 87, when the lid 61 is applied to the basin 60, are registered with the threaded bores 80 in the basin 60.

When the lid 61 is applied over the open top 75 of the basin 60, the holes 87 align and register with the bores 80 in the basin 60, and the inner and outer walls defining the channel 85 flank the short upstanding wall 77 of the basin 60. As such, the channel 85 and the gasket 86 in the channel 85 are disposed directly over the wall 77. When the lid 61 is fastened and tightened to the basin 60, the wall 77 compresses the gasket 86, extending upward into the channel 85. This forms a fluid-impermeable seal between the basin 60 and the lid 61, thereby defining the inner housing 12 as water and moisture tight.

The bottom 74 of the basin 60 has four short posts 90. The posts 90 extend in two directions: downwardly from the bottom 74 and away from the basin 60, and also upwardly into the inner hold 62. In the downward direction, the posts 90 project down to form a pedestal that lifts the bottom 74 off of the bottom 24 of the outer housing 11, so that if any water did intrude the outer hold 33, the inner housing 13 would be above it. Further, in that downward direction, the posts 90 include blind threaded sockets. The posts 90, and the blind threaded sockets, are aligned with mounts 91 in the bottom 24 of the outer housing 11. The mounts 91 are holes through the bottom 24, such that fasteners are applied through the mounts 91 and into the blind sockets in the posts 90 of the basin 60 to secure the basin 60 to the outer housing 11. When so secured, the basin 60 disposed the inner housing 13 proximate to the back 21 of the outer housing 11. Because the holes in the posts 90 are blind, they do not allow for fluid ingress to or egress from the inner housing 13. In the upward direction, the posts 90 also project upward and also include blind holes extending into the posts 90. These posts 90 provide mounting locations for the internal components of the inner housing 13.

On the left side 72 of the basin 60 is a bore through the sidewall. A water-tight cord connector fitting 92 is set into this bore, and electrical cords extending from the electrical components carried within the inner housing 13 to the components carried in the front 20 of the outer housing 11 pass through the fitting 92. The fitting 92 has a threadable cap which, when rotated, tightens around the cords passing through the fitting 92 to create a seal which prevents water ingress into the inner housing 13.

Figure 4:
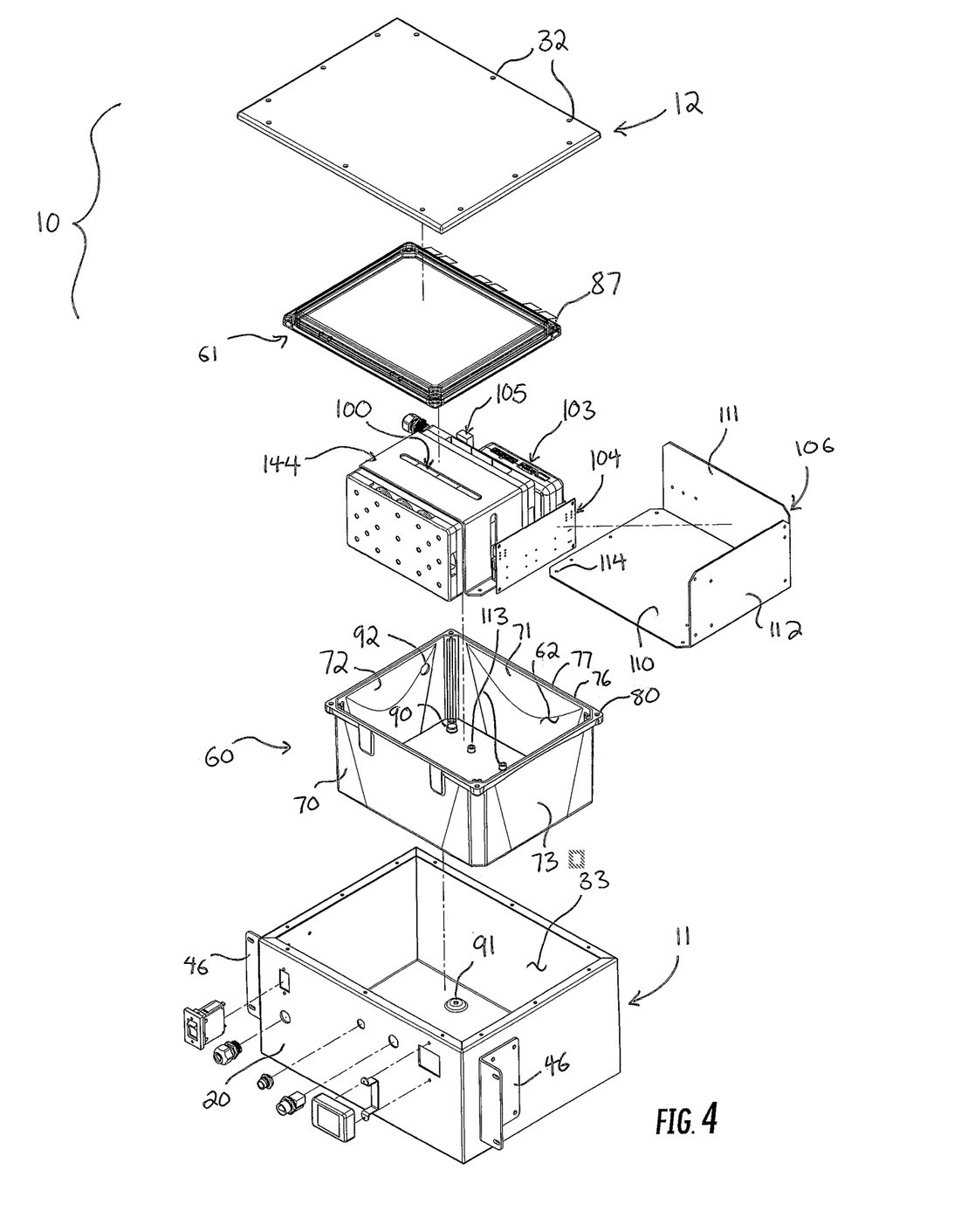
FIG. 4 is an exploded top perspective view of the battery pack.
Figure 5:
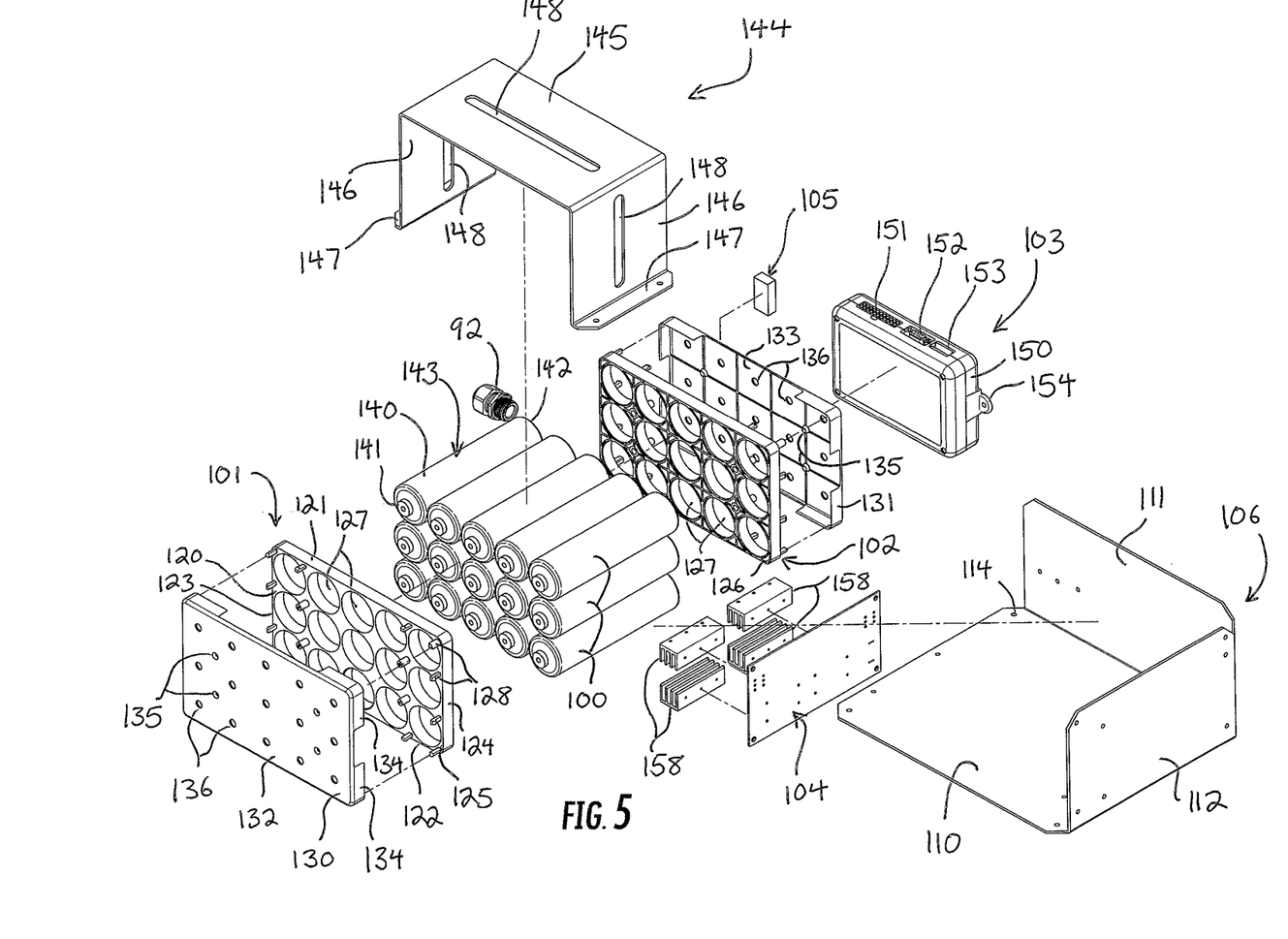
FIG. 5 is an exploded top perspective view of contents of an inner housing of the battery pack.

Referring now primarily to FIGS. 3-5, the inner hold 62 within the inner housing 13 contains the electrical and electronic components of the batter pack 10, protected from the environment outside the outer housing 11. These components include a plurality of lithium battery cells 100 stacked in an array and supported in two spaced-apart webs 101 and 102 entirely within the inner hold 62. The cells 100 are electrically coupled to a battery management system 103, a control board 104, and an asset tracker 105. All of these components are mounted to a tray 106 within the inner housing 13.

The tray 106 is best seen in FIG. 5. The tray 106 has a flat, rectangular bottom panel 110. From the back of the bottom panel 110 of the tray 106, proximate the back 71 of the basin 60, a rear wall 111 rises upwardly, normal to the bottom panel 110. From the side of the bottom panel 110, proximate the back right side 73 of the basin 60, a side wall 112 rises upwardly, also normal to the bottom panel 110. Preferably, the rear wall 111 and side wall 112 are spaced apart from each other by a vertical gap between the rear and side walls 111 and 112. The bottom panel 110, rear wall 111, and side wall 112 are formed integrally and monolithically to each other, preferably as a single sheet of material, such as metal, bent to form the tray 106 shown in the drawings.

The tray 106 is fixed within the inner hold 62 of the inner housing 13. A plurality of mounts 113 rises upward from the bottom 74 of the basin 60. These mounts 113 are blind sockets extending down toward the bottom 74 of the basin. A corresponding plurality of holes 114 is formed in the bottom panel 110 of the tray 106 in the same pattern as the mounts 113 on the bottom panel 110. When the tray 106 is placed into the basin 60 such that the holes 114 in the tray 106 register with the mounts 113 in the basin 60, the tray 106 is centered with respect to the bottom 74. Fasteners may then be placed through the holes 114 and into the blind sockets of the mounts 113 to secure the tray to the basin 60. The rear wall 111 is spaced slightly apart from the back 71 of the basin 60, and the side wall 112 is spaced slightly apart from the right side 73 of the basin 60. The tops of the rear and side walls 111 and 112 extend up to, but stop just short of, the top 75 of the basin 60.

Referring now primarily to FIG. 5, the battery cells 100 are mounted entirely within the tray 106. The battery cells 100 are carried by the webs 101 and 102. The webs 101 and 102 are identical but oppositely oriented, and as such only one will be described, with the understanding that the description of one applies equally to the other. Because they are identical, the webs 101 and 102 share identical structural elements and features and so the same reference characters are used to identify the same structural elements and features. The web 101 includes a thin, upstanding frame 120 having a top 121 and an opposed bottom 122, opposed sides 123 and 124, and a front 125 and opposed back 126. Formed entirely through the frame 120 are a plurality of cradles 127 or holds.

Each cradle 127 is circular and sized to snugly receive the outer diameter of each cell 100 and thereby snugly hold the cell 100 itself. The cradles 127 are arranged in an array. There are at least two rows of two cradles 127 each. In the preferred embodiment shown in the drawings, there are three rows of cradles 127 with five cradles 127 in each row (or five columns or three cradles 127 each). The cradles 127 are arranged in a grid, rather than in an offset fashion: each cradle 127 in a row is above and/or below a cradle 127 in another row.

The webs 101 and 102 engage with end covers 130 and 131. The back 126 of the web 101 is substantially flat: there are no projections, protrusions, or other features which extend beyond the flat back 126. The front 125, however, includes a number of short posts 128 which project beyond the front 125 of the web 101. These posts 128 join the web 101 to the end cover 130 and join the web 102 to the end cover 131. Four posts 128 project out from the front 125 of the web 101 along each of the sides 123 and 124, and another four posts project out from the front 125 just inboard of each column of cradles 127 proximate the sides 123 and 124. The posts 128 thereby flank each cradle 127 proximate the sides 123 and 124, with four posts 128 surrounding each such cradle 127.

The end covers 130 and 131 are identical but oppositely oriented, and as such only one will be described, with the understanding that the description of one applies equally to the other. Because they are identical, the end covers 130 and 131 share identical structural elements and features and so the same reference characters are used to identify the same structural elements and features. The end cover 130 is flat and thin, having a flat front face 132 and a flat rear face 133. It is rectangular, coextensive in size and shape to the web 101. At each of the four corners of the end cover 130, a thin L-shaped flange 134 projects rearwardly from the rear face 134. The flange 134 is a contiguous extension of the perimeter edge of the cover 130 between the front and rear faces 132 and 133, wrapping around the corner and projecting rearward. The posts 128 on the outside edge of the web 101 fit snugly into the flanges 134. The two posts 128 which are not on the outside edge of the web 101 fit into small sockets 135 on the rear face 133 of the end cover 130.

The battery cells 100 are contained between the webs 101 and 102 and the end covers 130 and 131. Referring to FIGS. 3 and 5, each battery cell 100 is a lithium battery and includes an elongate casing 140 having a cathode 141 and an anode 142 at opposed ends. The casing 140 of each battery is cylindrical and is snugly fit into a cylindrical cradle 127. The webs 101 and 102 are just inboard of the cathode 141 and anode 142, and the cathodes 141 and anodes 142 are against the end covers 130 and 131. In some embodiments, the battery cells 100 are all aligned in the same direction, such that all of the cathodes are against the end cover 130 and all of the anodes are against the other end cover 131 (or vice versa). In other embodiments, the battery cells 100 are arranged in an alternating fashion. In either embodiment, the battery cells 100 are preferably stacked in an array 143. The array 143, like the cradles 127, includes three rows of five battery cells 100 each. The cradles 127 in the webs 101 and 102 are spaced apart from each other such that the casings 140 of the battery cells 100 are in contact with neighboring casings 140.

The battery cells 100 are held in this stacked array 143 by a strap 144. The strap 144 is shown most clearly in isolation in FIG. 5 and in use in FIG. 3. The strap 144 is wrapped tightly over the array 143 of battery cells 100, securing them against the bottom panel 110 of the tray 106. The strap 144 is rectangular, preferably formed from a single sheet of a material such as metal; it has a central section 145, two opposed legs 146 extending downward from the central section 145, and two feet 147 at the bottom of those legs 146. The central section 145 is flat and extends entirely over the top row of battery cells 100. The legs 146 depend downwardly therefrom, extending from the top row of the battery cells 100 to the bottom panel 110 of the tray 106, close to the two outside columns of battery cells 100. The central section 145 thus keeps the battery cells 100 from coming loose in a vertical direction, and the legs 146 keep the battery cells 100 from coming loose in a horizontal direction. The feet 147 are bent outward from the bottoms of the legs 146 in opposite directions, and the feet 147 are secured to the bottom panel 110 of the tray 106 with screws, bolts, or the like. Elongate slots 148 are formed through each of the central section 145 and the legs 146.

The cathodes 141 and anodes 142 are outside the webs 101 and 102 but are in contact with the end covers 130 and 131. A plurality of holes or knockouts 136 are formed through the end covers 130 and 131, each aligned with a central axis of the cradle 127 with which it is registered. Cabling extends through these knockouts 136 to couple electrically to the cathodes 141 and anodes 142 of the battery cells 100. The cabling is not shown in the drawings for clarity of the illustration.

The cabling couples the battery cells 100 to the battery management system or BMS 103, shown best in FIG. 5. The BMS 103 controls and reports operating information about the battery cells 100. The BMS 103 includes an outer housing 150 having a power port 151, a data port 152, and a control port 153. The housing 150 is fastened to the rear wall 111 of the tray 106 at two tabs 154 on both sides of the housing 150. This spaces the BMS 103 apart from the battery cells 103 by a gap approximately the width of the BMS 103. In other embodiments, the BMS 103 is fastened to the side wall 112. The cabling from the battery cells 100 is connected to the BMS 103 at the power port 151; all the electrical lines connected to the battery cells 103 are routed through the inner hold 62 to a multiple-pin connector plugged into the power port 151. The data port 152 on the BMS 103 has several cables extending out of the data port 152, through the cord connector fitting 92 and to the components set into the front 20 of the outer housing 11. The BMS 103 sends and receives data through the data port 152 to those components. Finally, the control port 153 on the BMS 103 has a plurality of cables extending out of the port 153 and to the control board 104. The BMS 103 sends and receives data through the data port 152 to the control board 104.

The control board 104 controls the operation of the battery pack 10. The control board 104 is fixed to the side wall 112 with four fasteners at each corner of the control board 104; short spacers slipped over the shanks of the fasteners act to space the control board 104 apart from the side wall 112. Further, the control board 104, when so secured to the side wall 112, is spaced apart from the battery cells 100 by a gap. Cables extend from the control port 153 of the BMS to the control board 104. Cables also extend from the control board 104, through the cord connector fitting 92 and to the components set into the front 20 of the outer housing 11. The control board 104 is a printed circuit board carrying programmable logic elements. Finned heat sinks 158 are mounted on the control board 104 to passively cool the control board 104.

The battery pack 10 also includes the asset tracker 105. The asset tracker 105 is a data communication device. In the drawings, the asset tracker 105 is shown proximate the rear wall 111 of the tray 106, but in other embodiments it is located elsewhere, such as in or just behind the front 20 of the outer housing 11. The asset tracker 105 includes a cellular antenna for communicating with an LTE network, receiving data from a central server, and transmitting data to the central server. The asset tracker 105 is coupled to the BMS 103 and receives operating information about the battery cells 100 from the BMS 103 such as operating status (ON or OFF), the percentage capacity of the battery cells 100, and other configurable information (such as whether the operating temperature of the battery cells 100 is above or below a configurable alarm limit). The asset tracker 105 receives power from the battery cells 100 but also includes an internal battery as a backup if the battery cells 100 are drained. When it is receiving power—either from a power source external to the battery pack 10, from the battery cells 100, or from its own internal battery—it can receive instructions through the LTE network and respond in kind. The asset tracker 105 includes a GPS chip, such that, if the battery pack 10 is removed from the telecommunications cabinet, the asset tracker 105 will transmit its location, as well as operating information about the battery pack to a central server. This allows a central server owner to monitor the location and movement of the battery pack 10. The asset tracker 105 transmits battery cell 100 capacity levels, ON or OFF status, temperature information, GPS coordinates, and other information as configured by the owner of the central server.

In operation, the battery pack 10 provides backup power to a telecommunications cabinet. The battery pack 10 must first be prepared, if not already assembled in a prepared fashion. To prepare the battery pack 10, the following steps are taken, not necessarily in the order presented below. The battery cells 100 are placed in the webs 101 and 102, stacked into the array 143, and secured with the strap 144. The strap 144 is secured to the tray 106 and the end covers 130 and 131 are placed over the cathodes 141 and anodes 142 sticking out from the webs 101 and 102. The BMS 103, control board 104, and asset tracker 105 are each mounted to the tray 106, and electrical cables are then routed among and connected to each of those components and the battery cells 100. The tray 106 and the components thereon are then applied to the inner hold 62 of the inner housing 13 and secured therein. The cabling is routed through the cord connector fitting 92, and the basin 60 is then placed into the outer hold 33 of the outer housing 11 and secured therein. The cabling from the basin 60 is then connected to the electronic components in the front 20 of the outer housing 11. The lid 61 for the inner housing 13 is placed onto the basin 60 of the inner housing 13 and secured thereto, thereby forming a fluid-impermeable seal. Lastly, the lid 12 is placed over the outer housing 11 and fastened tightly thereto, forming a fluid-impermeable seal therebetween.

With the battery pack 10 so prepared, the battery pack 10 is installed in the cabinet. In cabinets that have nineteen-inch racks, the installing technician selects the nineteen-inch bracket 46 and secures the major leaves 54 thereof to the left and right sides 22 and 23 of the outer housing 11. The battery pack 10 is then positioned so that the minor leaves 55 of the brackets 46 are positioned in contact against the front of the rack, and the vertical two-hole pattern of the minor leaves 55 are registered with the holes in the front of the rack. The technician then secures the brackets 46 to the rack with screws or bolts or like fasteners. This secures the battery pack 10 in the rack. Often, the battery pack 10 will be positioned in the rack at or near the bottom of the cabinet.

With the battery pack 10 installed in the cabinet, it can be connected to the telecommunications equipment therein. The telecommunications equipment in the cabinet typically has an AMP connector, which is coupled to the battery pack 10 at the power port 41. Cables extend from the back of the power port 41, through the outer hold 33, and are coupled electrically to the battery cells 100 to provide power to the power port 41. The power port then provides forty-eight volts of DC power to a device connected thereto. Once the AMP connector is plugged into the power port 41 on the front 20, the battery pack 10 is connected. The technician toggles the power switch 40, which powers the battery pack 10 on.

The battery pack 10 provides backup power to the cabinet. Generally, the telecommunications cabinet receives electrical power from a line. If the source of that power fails, the battery pack 10 detects this failure and begins supplying power to the equipment in the cabinet through the cable connected to the power port 41. The battery pack 10 preferably provides a nominal voltage of 48 volts at a standard discharge rate of approximately 7.5 Amps or less. The voltage can change depending on the load, from a maximum voltage of approximately 56.25 volts to a minimum voltage of approximately 33 volts. The discharge current can also change, up to a maximum continuous discharge current of 14.5 Amps and a maximum pulse discharge current of 15 Amps. During use or discharge of the battery cells 10, the battery pack has a working temperature range of approximately −20 degrees Celsius to 60 degrees Celsius. The battery pack 10 has approximately a fourteen to fifteen Amp-hour capacity.

When power is returned, the battery cells 100 are charged by the available power. The battery pack 10 charges at a standard current of approximately 5 Amps or less, a maximum continuous current of approximately 10 Amps or less, and a maximum pulse current of approximately 25 Amps or less. During charging of the battery cells 10, the battery pack 10 has a working temperature range of approximately 0 degrees Celsius to 60 degrees Celsius.

When the battery pack 10 is operational, the technician can observe operational characteristics and information about the battery pack 10 on the display 44 in the front 20 of the battery pack 10. The display 44 is connected to the BMS 103 and displays information such as temperature alerts and battery level. In other embodiments, the display 44 may be a series of LED indicator lights on the front 20, each corresponding to an operational status of the battery pack 10.

The BMS 103 monitors and maintains the performance and operation of the battery cells 100. The BMS 103, together with the control board 104, monitors the capacity of the battery cells 100. A thermocouple inside the inner hold 62 monitors the temperature of the battery cells 100 and is coupled to the BMS 103. The BMS 103 controls the discharging and charging of the battery cells 100, based on the load, the temperature, the discharge/charge time elapsed, and the battery capacity level.

The technician can also connect to the I/O port 42 and 43 on the front 20 of the outer housing 11 to read and write information from the battery pack 10. The I/O port 42 is a CAN bus-style connection; the technician couples a complemental cable between the I/O port 42 and his computer to read data from or write data to the control board 104. The I/O port 43 is an RS-232-style connection; the technician couples a complemental cable between the I/O port 43 and his computer to read data from or write data to the BMS 103.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A battery pack comprising:
    a rectangular prismatic outer housing including a front and a back, opposed sides, a bottom and an open top, and an outer housing lid applied to the open top to define a closed outer hold within the outer housing;
    a power switch, a power port, an input/output, and a display all carried in the front of the outer housing;
    an inner housing within the outer hold of the outer housing, the inner housing comprising a basin and an inner housing lid applied to the basin to define a closed inner hold within the inner housing; and
    a plurality of battery cells disposed entirely within the inner hold, wherein the battery cells are electrically coupled to the power port to provide power to the power port.

2. The battery pack of claim 1, wherein:
    the inner housing lid includes a perimeter, a downwardly-turned channel at the perimeter, and a gasket in the channel;
    outboard of the channel, the inner housing lid includes holes formed through the inner housing lid and registered with tapped holes in the basin; and
    when the inner housing lid is secured to the basin with fasteners applied to the holes and the tapped holes, the gasket is compressed between the channel and the basin to form an impermeable seal.

3. The battery pack of claim 1, further comprising:
    blind sockets on a bottom of the basin; and
    bores in the bottom of the outer housing registered with the blind sockets, the bores arranged on the bottom to dispose the inner housing proximate to the back of the outer housing.

4. The battery pack of claim 1, further comprising:
    a tray within the inner hold;
    the plurality of battery cells stacked in an array on the tray; and
    a strap secured to the tray and wrapped over the array of battery cells.

5. The battery pack of claim 4, wherein the tray includes a bottom panel, a rear wall, and a side wall.

6. The battery pack of claim 5, further comprising a battery management system, for controlling and reporting operating information about the battery cells, which is fixed on one of the rear and side walls and is spaced apart from the battery cells.

7. The battery pack of claim 5, further comprising a control board, for controlling operation of the battery pack, which is fixed on one of the rear and side walls and is spaced apart from the battery cells.

8. The battery pack of claim 1, further comprising:
    a web defining a plurality of cradles, each cradle holding a battery cell;
    each battery cell has opposed anode and cathode ends and is elongate therebetween; and
    each battery cell is supported in the cradle between the anode and cathode ends.

9. The battery pack of claim 8, further comprising end covers flanking all of the battery cells at the anode and cathode ends thereof, wherein each end cover is formed with a knockout registered with each battery cell.

10. The battery pack of claim 1, further comprising a kit of first and second mounting brackets, wherein each of the first and second mounting brackets has a first leaf having a first dimension and a second leaf having a second dimension, the first and second leaves set at a right angle with respect to each other;

wherein on the first mounting bracket, the first and second dimensions are equal; and on the second mounting bracket, the first dimension is greater than the second dimension.

11. A battery pack comprising:
a rectangular prismatic outer housing including a front and a back, opposed sides, a bottom and an open top, and an outer housing lid applied to the open top to define a closed outer hold within the outer housing;
a power port carried in the front of the outer housing;
an inner housing within the outer hold of the outer housing, the inner housing comprising a basin and an inner housing lid applied to the basin to define a closed inner hold within the inner housing;
a tray within the inner hold;
a plurality of battery cells stacked in an array on the tray; and
a strap secured to the tray and wrapped over the array of battery cells.

12. The battery pack of claim 11, wherein the array includes at least two rows and at least two columns of battery cells.

13. The battery pack of claim 11, wherein the tray includes a bottom panel, a rear wall, and a side wall.

14. The battery pack of claim 13, further comprising a battery management system, for controlling and reporting operating information about the battery cells, which is fixed on one of the rear and side walls and is spaced apart from the battery cells.

15. The battery pack of claim 13, further comprising a control board, for controlling operation of the battery pack, which is fixed on one of the rear and side walls and is spaced apart from the battery cells.

16. The battery pack of claim 11, further comprising:
a web defining a plurality of cradles, each cradle holding a battery cell;
each battery cell has opposed anode and cathode ends and is elongate therebetween; and
each battery cell is supported in the cradle between the anode and cathode ends.

17. The battery pack of claim 16, further comprising end covers flanking all of the battery cells at the anode and cathode ends thereof, wherein each end cover is formed with a knockout registered with each battery cell.

18. A battery pack comprising:
a rectangular prismatic outer housing including a front and a back, opposed sides, a bottom and an open top, and an outer housing lid applied to the open top to define a closed outer hold within the outer housing;
a power port carried in the front of the outer housing;
an inner housing within the outer hold of the outer housing, the inner housing comprising a basin and an inner housing lid applied to the basin to define a closed inner hold within the inner housing;
a plurality of battery cells disposed entirely within the inner hold, wherein the battery cells are electrically coupled to the power port to provide power to the power port; and
a kit of first and second mounting brackets, wherein each of the first and second mounting brackets has a first leaf having a first dimension and a second leaf having a second dimension, the first and second leaves set at a right angle with respect to each other;
wherein on the first mounting bracket, the first and second dimensions are equal; and
on the second mounting bracket, the first dimension is greater than the second dimension.

19. The battery pack of claim 18, wherein the first and second leaves are rigidly and integrally formed to each other.

20. The battery pack of claim 18, wherein:
the inner housing lid includes a perimeter, a downwardly-turned channel at the perimeter, and a gasket in the channel;
outboard of the channel, the inner housing lid includes holes formed through the inner housing lid and registered with tapped holes in the basin; and
when the inner housing lid is secured to the basin with fasteners applied to the holes and the tapped holes, the gasket is compressed between the channel and the basin to form an impermeable seal.

21. The battery pack of claim 18, further comprising:
blind sockets on a bottom of the basin; and
bores in the bottom of the outer housing registered with the blind sockets, the bores arranged on the bottom to dispose the inner housing proximate to the back of the outer housing.

22. The battery pack of claim 18, further comprising:
a tray within the inner hold;
the plurality of battery cells stacked in an array on the tray; and
a strap secured to the tray and wrapped over the array of battery cells.

23. The battery pack of claim 22, wherein the tray includes a bottom panel, a rear wall, and a side wall.

24. The battery pack of claim 18, further comprising:
a web defining a plurality of cradles, each cradle holding a battery cell;
each battery cell has opposed anode and cathode ends and is elongate therebetween; and
each battery cell is supported in the cradle between the anode and cathode ends.

25. The battery pack of claim 24, further comprising end covers flanking all of the battery cells at the anode and cathode ends thereof, wherein each end cover is formed with a knockout registered with each battery cell.

* * * * *